June 12, 1962 A. HUNDERE 3,038,454
METHOD FOR REMOVING DEPOSITS FROM COMBUSTION CHAMBERS OF INTERNAL COMBUSTION ENGINES
Filed Feb. 29, 1960 2 Sheets-Sheet 1
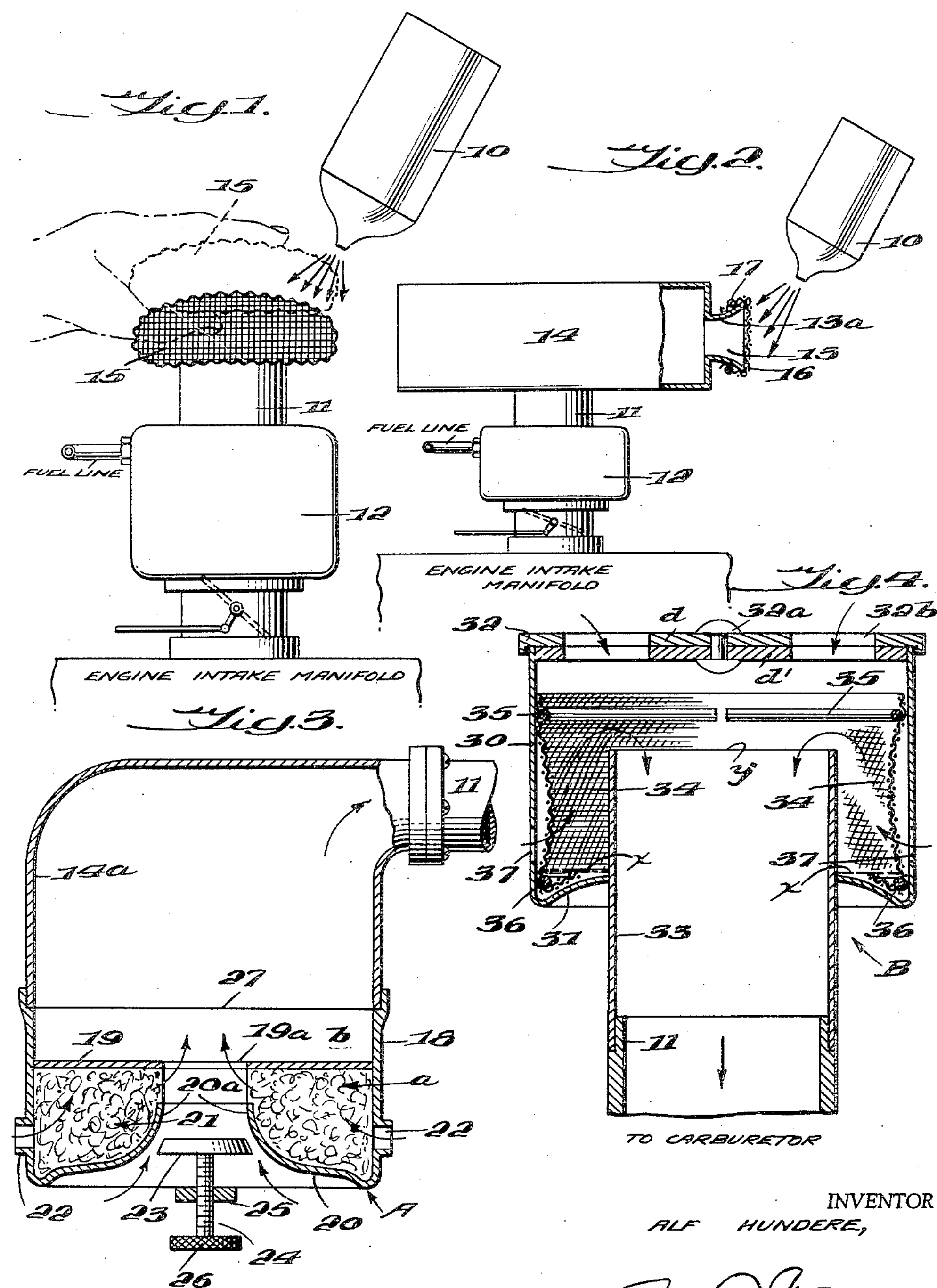
INVENTOR
ALF HUNDERE,
BY [signature]
ATTORNEY June 12, 1962 A. HUNDERE 3,038,454
METHOD FOR REMOVING DEPOSITS FROM COMBUSTION CHAMBERS OF INTERNAL COMBUSTION ENGINES
Filed Feb. 29, 1960 2 Sheets-Sheet 2
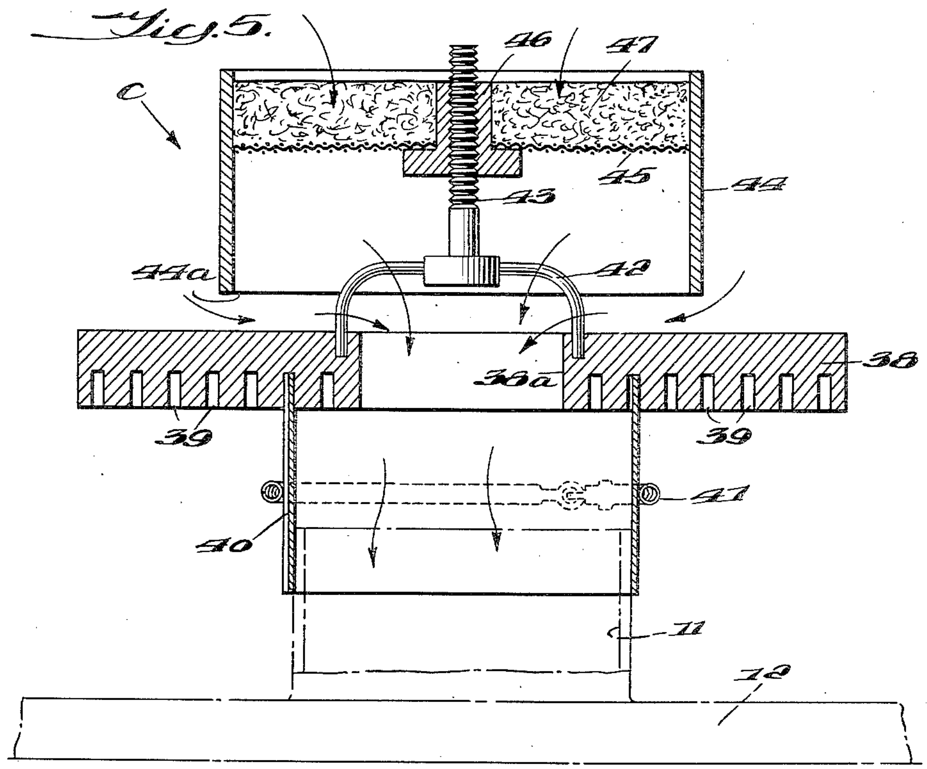
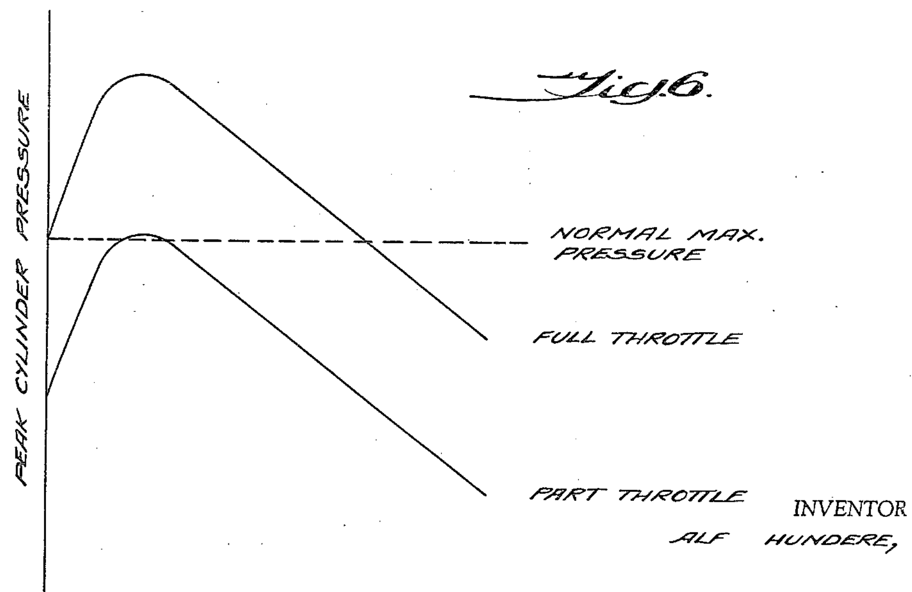
INVENTOR
ALF HUNDERE,
ATTORNEY United States Patent Office 3,038,454

Patented June 12, 1962

3,038,454

METHOD FOR REMOVING DEPOSITS FROM COMBUSTION CHAMBERS OF INTERNAL COMBUSTION ENGINES

Alf Hundere, 2102 La Manda Blvd., San Antonio, Tex.

Filed Feb. 29, 1960, Ser. No. 11,690
8 Claims. (Cl. 123—1)

This invention relates to an improved method for removing combustion chamber deposits in spark-ignition internal combustion engines.

It is common knowledge that products of incomplete combustion and the ash residue from combustion leave deposits in the combustion chamber of spark ignition engines. These deposits are from both the fuel and the oil and are objectionable because they reduce the power of the engine, by reducing the air flow to the engine (volumetric efficiency) and because they increase the octane requirements for the normal performance of the engine—hence, causing "knock" or requiring a higher octane fuel to prevent "knock." "Knock" may be defined as compression ignition or auto-ignition of the fuel mixture prior to the passage of the normal flame front initiated by the spark plug.

Numerous methods have been proposed to remove these deposits without removing the cylinder head such as the use of solvents, burning the deposits out with oxygen and blasting them out by various mechanical means. All these mentioned prior methods have met with little success either because of their ineffectiveness and deleterious effects and/or their complexity.

Also, it has been suggested previously, as in United States Letters Patent 2,785,662 and 2,843,645, that the phenomenon of, so-called, engine-knock may be utilized to remove these deposits from the combustion chamber of engines. In these patents, the fuel line to the carburetor is disconnected and a temporary fuel line substituted to supply a liquid fuel of a lower octane value to the carburetor for normal atomization and mixing with the air. These prior suggestions afford little control in maintaining the proper permissible "knock" intensity for the most effective removal of the said combustion chamber deposits without increasing the engine stresses significantly above normal. Such control is necessary due to the variation in the octane requirement of engines and the need for preventing above-normal stresses which can be harmful to the engine. The only control maintained over knock intensity exercised in these patents is by changing the octane number of the knock producing fuel or by the position of the throttle valve. This latter control is limited to the operator's evaluation of knock intensity which is normally very poor. In addition to these disadvantages, the change-over, required by the aforesaid patents from one liquid fuel to another, presents not only an unnecessarily complex mechanical operation but one fraught with a serious fire hazard.

I have discovered that all of the above mentioned drawbacks of the prior art may be effectively overcome, in removing combustion chamber deposits in spark-ignition engines, by the utilization of "knock" in a manner whereby the required intensity of said "knock" shock can be nicely controlled at all times and wherein there is no change-over from the normal liquid fuel supplied to the carburetor to a different liquid fuel that produces the knock in the engine cylinder.

The prime aim or object of this invention is to induce "knock" in the combustion chamber of internal combustion engines by introducing a controlled amount of a pro-knock or detonant substance, in the form of a gas or vapor, into the air stream, entering the carburetor of such engine, to mix with and be entrained by the said air, in a controlled ratio of detonant to air, so that the said air and pro-knock mixture will be carburetted with the normal nebulized liquid fuel within the carburetor, from which it is drawn into the engine cylinder or cylinders by the operation of said engine.

Another object of the invention is the provision of novel means by which the invention may be practiced.

Other objects and advantages of the present invention will be apparent from the following detail description when considered with the accompanying drawings in which:

FIGURE 1 illustrates one of the simplest means by which the present invention may be performed, that is, by applying an absorbent material, having a minimum restriction to air flow therethrough, to the air inlet of a carburetor and controllably spraying or applying the pro-knock substance thereto;

FIGURE 2 illustrates another means whereby an absorbent cloth, carrying a controlled amount of the pro-knock substance, is applied at the inlet of an air-cleaner associated with a carburetor of an engine;

FIGURE 3 shows modified form of a pro-knock applicator for an air-cleaner of a carburetor;

FIGURE 4 shows still another form of a pro-knock applicator that may be fitted into the inlet air-pipe of a carburetor;

FIGURE 5 shows a universal pro-knock applicator removably applicable to carburetor air inlets of varying sizes, and FIGURE 6 is a graph illustrating that normal peak cylinder pressures of an engine are not exceeded in the practice of this invention.

In carrying my invention into practice, I make use of the thermal and pressure shock associated with "knock." The harmful effect of such knock to the engine for short periods (such as for the removal of said deposits) is a function of the peak pressures occurring in the combustion chamber, and, therefore, these peak pressures are to be avoided. The most harmful "knock" to the engine occurs at full open throttle when all of the carburetted fuel-mixture self-ignites and when the piston is at the top dead-center, and, at this piston position, the combustion chamber volume is at its minimum causing the pressure in the combustion chamber to be at its maximum.

I have found that the optimum "knock or shock wave" intensity is obtained for the removal of the combustion deposits when the self-ignition of the fuel mixture can be made to occur as early as possible in the compression stroke of the piston; and, combining this with reduced manifold pressures, it is readily possible to avoid exceeding the normal wide-open throttle peak pressures in the combustion chamber, as illustrated in FIGURE 6. As shown, normal peak pressures are not exceeded if the knock can be made to occur as early as possible in the cycle, which can be accomplished by introducing a pro-knock vapor of maximum pro-knock effect and by having a means for adjusting the quantity to satisfy the engine. Since full-throttle is not required for effective deposit removal by my invention, further protection is afforded by using a partially open throttle to avoid excessive peak pressures and which, as FIGURE 6 shows, can also prevent exceeding the normal maximum peak pressures. Having the "knock" occur as early as possible in the cycle has an added beneficial effect in addition to reducing the peak pressures. The earlier in the cycle the "knock" occurs, the longer the burned gases are in the cylinder and therefore the greater the thermal stress placed on the deposits.

According to the present invention, the obtaining of optimum "knock" intensity is accomplished by supplying a controlled quantity of pro-knock or detonant material in the form of a gas or vapor to the air stream ahead of the carburetor while the engine is running at idle-speed or partially open-throttle; and, then, increasing the quantity until knock is detected or until any greater quantity tends to cause a loss in speed or rough running. Because of the early occurrence of the "knock" in the cycle, an increased temperature-rise is added to the normal thermal shock, which, together with the pressure shock, increases the effectiveness of the "knock" to break-away the carbonaceous deposits on the walls of the combustion chamber and discharge them through the exhaust system of the engine. Also, by obtaining the maximum permissible "knock" in the manner just described, the danger is reduced of exceeding the normal wide-open-throttle peak pressures in the combustion chamber because the farther the throttle is opened, the earlier the knock occurs in the cycle, and, hence, the less chance of exceeding such peak pressures.

The pro-knock material is, preferably, introduced at the air-inlet of the carburetor of an internal combustion engine in the form of a gas or vapor in order that it will intermix with and be entrained in the air stream; and this intermixture then mixes or is carburetted with the atomized gasoline (or other normal engine fuel) in the carburetor, which combined mixture is then drawn, as charges, into the combustion chamber of the engine in the usual manner during the operation of the engine. The pro-knock material may be introduced into the air-inlet of the carburetor by a controlled atomization of it into the air-inlet or by applying an adjusted quantity of pro-knock liquid to an absorbent material through or along which the air, drawn into the carburetor, passes.

As a pro-knock material, amyl nitrate, propyl nitrate, ethyl nitrate, nitromethane, nitropropane, di-tertiary-butyl peroxide, ethyl ether, nitrous oxide or chlorine, or combinations of them, may be employed, as well as any volatile compound having the same characteristic property for causing "knock" in engines when mixed with the normal fuel mixture of the engine. However, a mixture of ethyl nitrate (about 60%) and normal propyl nitrate (about 40%), with a boiling range of about 190 to 232° F., has good volatility characteristics for the normal range of atmospheric temperatures and has been most generally used in connection with this process.

In the utilization of the broad principle of the method of this invention in connection with spark-ignition engines to remove combustion chamber deposits, the engine may be operated in a number of ways, of which the following have been found preferable, up to this time, in the order stated:

(1) The engine is brought up to normal operating temperature peculiar to that engine, which warm-up may be accelerated by covering the front of its radiator (liquid cooled engine only), and, while the engine is operating substantially without external load, a pro-knock vapor is introduced into the air-inlet of the carburetor in an adjusted quantity so as to obtain audible knock at idle throttle setting (i.e., between about 500 and 1000 r.p.m.) and then maintaining a substantially constant mixture ratio of pro-knock vapor to air, but not sufficient to cause significant loss in engine speed; then rapidly opening the throttle valve of the engine to approximately one-half open position (manifold vacuum 4 to 8" Hg) for a period sufficient to allow the engine speed to increase to between 2000 to 4000 r.p.m. and, then, closing the throttle valve and allowing the engine speed to drop back to idle-running. By this operation, 50 cycles will normally result in 80 to 95% removal of the aforesaid carbonaceous deposit from the combustion chamber. This operation breaks down and loosens the carbonaceous deposits on the walls formings the combustion chamber and removes and discharges them through the exhaust system of the engine. The operator may determine the rate of the removal of the carbonaceous particles, as well as when effective removal has been accomplished, by visual inspection of the deposits coming out of the exhaust pipe of the engine, or by catching the particles in a suitable container or cloth, or simply by holding his hand at a safe distance from the end of the exhaust, if this happens to be convenient. However, since the quantity and type of the deposit may vary in different engines as well as the design of the engine may vary widely, it may be necessary, in some instances, to continue the above operation until the exhaust shows no emission of particles of said deposit. And, (2) The engine is brought up to normal operating temperature peculiar to that engine, and, while operating continuously under load conditions of 25 to 75% (as indicated by manifold vacuum and dependent on compression ratio and type of engine) at an engine speed of between 1000 to 4000 r.p.m., a pro-knock vapor or gas is then introduced into the air stream of the carburetor, and in a quantity as will cause a drop in engine power to between about ¼ to ¾ of what that power was before the pro-knock material was introduced and as measured by or indicated by engine torque and/or engine speed; and, then holding this condition of engine operation, by maintaining a substantially constant mixture ratio of pro-knock vapor to air, for a period of time, in the order of 60 seconds, or until the limit of engine temperature has been reached—such as evidenced by the coolant boiling (in a liquid cooled engine).

In the two procedures just described, for the employment of the method of this invention, only from one to three ounces (automobile engines) of the pro-knock material is used to produce better results with less danger of harm to the engine as against the methods of the prior art which require about a pint of pro-knock fuel and over which little control can be exercised to produce the self-ignition of the fuel charge at the proper intensity. It will be noted that, in the present method, the regular or normal fuel for the engine is used.

In practicing the method of this invention, an applicator device may be employed of a construction that absorbs a quantity (about 1 or 2 ounces for automobile engine) of the pro-knock compound, while in liquid form, and which may be controllably regulated by the operator so that, as the pro-knock compound is volatilized by the intake of atmospheric air at the carburetor, the desired amount of said pro-knock compound becomes entrained with said air during the operation of the engine.

When using the constant load technique, the pro-knock compound may be introduced directly into the air intake 11 of a carburetor 12 or into the air intake 13 of an air-cleaner 14 by any controlled flow vaporizer or atomizer such as a, so-called, aerosol-bomb with an adjustable flow valve. However, this method of supplying the pro-knock compound is not effective when inertial loading of the engine is employed—i.e., intermittent acceleration—as the ratio of pro-knock vapor-to-air inducted varies in direct proportion to the air flow and, hence, opening the throttle valve would cause the air-pro-knock mixture to be too lean. Therefore, there is disclosed in FIGURES 1 to 5, inclusive, applicator means that control the ratio of pro-knock vapor-to-air under intermittent acceleration as well as constant engine load.

The simplest form of the applicator device is shown in FIGURE 1, which device comprises a wad of sponge-like or absorbent material 15 of a size to rest upon or be placed against the opening of the air-inlet duct of a carburetor 12. The density of the sponge-like wad 15 should be such as to have a maximum of absorption and a minimum of restriction to air flow; and one such applicator device, that has worked satisfactorily, may be of loose wool yarn covered with loosely woven plastic netting. With the applicator device 15 in the position as shown in FIGURE 1, and with the engine running at fast idle speed (i.e., in the order of 1000 r.p.m.) the pro-knock liquid is applied to the absorbent device 15, by means of a plastic-squeeze bottle, or the like 10, so as to cover as much area of the absorbent device or wad 15 as possible. When "knock" in the engine is detected, the engine throttle-valve is rapidly opened to about 50% of its travel (producing about 4 to 8 inches Hg manifold vacuum depending on engine involved) and, then, after one or two seconds of time when the engine speed has increased to 2000 and 4000 r.p.m., the throttle valve is closed. When the engine returns to idle speed and the knock occurring at idle is more than a light knock, the flow of the pro-knock liquid to the device 15 is reduced; and, if knock is not present, the flow of pro-knock liquid to the wad device 15 is increased from the container 10 to obtain a light or insipient knock. When light knock is re-established, at idle speed of the engine, the cycle is repeated as discussed above.

Also, the same result is obtained by saturating the wad or absorbent device 15 with the pro-knock liquid and holding the device 15 sufficiently close to the air-inlet opening in the ducts 11, or 13, moving the device closer to the said openings to increase the "knock" or moving it farther away from said openings to reduce the "knock." This manner of applying the pro-knock compound, as shown in FIGURE 1, is suitable when practicing the invention in connection with an engine operated under continuous load conditions as well as when inertial loading of the engine is employed—i.e. intermittent acceleration—because by having the wad 15 saturated with the pro-knock fluid, the mixture ratio (ml. pro-knock fluid per pound of air) is increased with the opening of the throttle-valve, which is the desired effect. However, the method of application shown in FIGURE 1 requires nice and precise manipulation of the sponge 15 and of the pro-knock supply container 10 and only trained and skilled persons can properly control the amount of the pro-knock compound administered.

Easier control of the pro-knock vapor is obtained by the arrangement illustrated in FIGURE 2, which illustrates a down-draft carburetor 12 having a conventional air-cleaner 14 surmounted upon the air-inlet duct 11 thereof, the air-cleaner being provided with an air-inlet opening 13 surrounded by an outwardly projecting flange 13*a*. An absorbent and porous cloth 16 is stretched over the opening 13 and around the flange 13*a* and is removably maintained in place by a means, such as an elastic or resilient band or a circular helical spring 17, the latter known as a "garter-spring." With the pad-like cloth 16 held in place, the pro-knock liquid compound may be squirted onto the cloth 16 from the container 10 and the engine operated in the manner set-forth in the third paragraph herein next above.

Various types of applicators may be fitted to the air-cleaner of the carburetor or to the air-inlet duct of the carburetor itself as shown in FIGURES 3, 4 and 5; and these applicators have the advantage of permitting simple and easy control of the pro-knock vapor-air mixture ratio and the "knock" produced in the engine.

FIGURE 3 illustrates a pro-knock applicator A of a construction that may be removably fitted directly to a section 14*a* of the air cleaner of the type that has upward air flow, such as used on small stationary engines, and the applicator is designed to replace the section of the air cleaner that normally holds the oil bath. The applicator A comprises a relatively short tubular member 18, the upper end 27 of which is of a diameter to match that of the air cleaner section 14*a* and formed to fit the same, and is divided internally, by an annular partition 19 extending transversely thereof, so as to provide two compartments *a* and *b* in communication with each other by means of the central opening 19*a* in said partition. The compartment *a* is partially closed at its outer end by an annular wall 20, which is shaped somewhat similarly as a hollow frustrated cone with a circular flanged base secured to the end edge of the tubular member 18 and with the frusto-conical portion extending inwardly of compartment *a* for a distance to provide a throat 20*a* terminating at a point spaced from the partition 19, said terminating end of said throat 20*a* being aligned with and substantially of the same cross-sectional area as that of the opening 19*a* in said partition 19. The space in the compartment *a* is filled with a mass of absorbent and porous material 21, surrounding said throat 20*a* and the opening 19*a*, of a volume that will hold sufficient pro-knock detonant liquid to permit removal of deposits, according to the invention, but of a density which will not substantially restrict the flow of air therethrough as presently to be explained.

The side wall of the tubular member 18 is provided with a number of small openings or ports 22 adjacent the end wall 20, thus establishing air communication exteriorly of the applicator A through openings 22, through the absorbent material 21 in compartment *a* and through the partition opening 19*a*. The total area of the ports 22 must be equal to or greater than the area of opening 19*a* in the partition 19, both of which must be great enough to prevent restricting the air flow to the engine. A circular valve-member or restrictor 23 is positioned in and across the conical throat 20*a* and is carried, preferably, by a threaded rod or screw 24 threadedly mounted in a bar 25 extending diametrically across the outer end of and secured to the edge of the compartment *a*.

The outer free end of the threaded rod 24 is provided with a finger-piece or knurled knob 26, by which the valve member may be adjusted relative to the conical wall of the throat 20*a* to increase or diminish the atmospheric air drawn into the applicator through said throat 20*a*.

In the operation of the applicator A, the absorbent material 21 is saturated with the pro-knock liquid (by applying it through openings 22 or by providing a special opening in partition 19). The amount of pro-knock liquid required is a function of engine size, compression ratio, octane number of fuel, and degree of treatment required and thus varies from about ¼ to 3 cubic centimeters per cubic inch of piston displacement. When the applicator A is placed in position as shown in FIGURE 3, the engine may be operated in any of the manners set forth above. Atmospheric air is drawn, by the operation of the engine, through openings 22 and becomes saturated with pro-knock fluid as it passes through the absorbent material 21 and proceeds through the space between the inner end of the throat 20*a* to and through the partition opening 19*a* on its way to the carburetting chamber of the carburetor. The atmospheric air entering the applicator A through the throat 20*a* contains no pro-knock compound and, by adjusting the valve member 23 relative to the conical wall of the throat 20*a*, the ratio of air to the pro-knock compound, entering the air-duct 11 of the carburetor, may be increased or decreased to readily obtain the desired effect when operating the engine in either of the manners set forth above to remove the carbonaceous deposits.

Still another form of the applicator device B is illustrated in FIGURE 4 and comprises a container *c* for the pro-knock liquid and having, preferably, circular side wall 30 and a bottom wall 31 and is equipped with an adjustable closure 32 at its upper end for regulating the amount of atmospheric air inducted therethrough. A tubular member 33 extends through and centrally of said bottom wall 31 and is secured to said bottom wall with one, or its upper, end projecting into the container for a distance but substantially spaced from the upper end of said container and with its other, or lower, end projecting outwardly beyond the wall 31 of said container. The tubular member 33 is of a diameter suitable to fit, or approximately fit, the air-intake opening 11 of a carburetor of the particular engine for which the applicator is intended. A circular or sleeve-like absorbent cloth curtain 34, of approximately the same diameter as the interior of the container *c*, is positioned about the inner surface of the wall 30 and is held in place by two resilient split retaining rings 35 and 36 disposed within and at the end portions of said cloth sleeve 34. One end of the sleeve 34 is positioned at the bottom of the container adjacent its bottom wall 31 and the other end of the sleeve extends, preferably, above the upper end of the tubular member 33 but spaced from the closure 32. A plurality of air-ports 37 are provided in the lower portion of the side wall 30 of the container *c* and positioned a distance above the normal liquid-level *x* therein.

The closure 32 may comprise two superposed concentric discs *d* and *d'* pivoted together at their axial center, as at 32*a*, and each having two or more concentrically arranged and spaced ports 32 therein adapted to be brought in and out of register with each other in a manner of the well known disc-shutter, and, when fully open, allows maximum air-intake. The combined areas of the ports 32*b* and the combined areas of the ports 37 are equal to or greater than the cross-sectional area of the tubular member 33 so as not to cause any restriction to the air flow to the engine.

When using the applicator B, in any manner as above described, the pro-knock liquid is placed in the container *c* to about the level *x* and the curtain 34 acts as a wick to absorb it; and, as air is drawn by the suction of the engine through the ports 37, it passes through and along said sleeve and picks up vapor from the pro-knock liquid and, then, passes over the end *y* of the tubular member 33 as indicated by the arrows; and, at the same time, atmospheric air is drawn into the container *c* through ports 32*b*, if the disc *d* is positioned to open the ports 32*b*. By rotating the disc *d* relative to the disc *d'*, the flow of atmospheric air hrough the ports 32*b* can be regulated from maximum intake to zero intake. In the operation of this form of applicator B, the atmospheric air, induced through the ports 32*b*, can be nicely regulated by the disc-shutter *d* so as to control the degree of dilution of the pro-knock-air entrained mixture passing through the ports 37 and over the edge *y* of the tubular member 33.

Another form of applicator device C is shown in FIGURE 5, wherein an annular disc-like member 38 has a plurality of grooves 39 formed in one, or the under, face thereof, said grooves each being of different diameters and of a width to register with and receive therein the open end portion of a suitable adapter 40. This adaptor 40 may be of a radially expandable type and may be a flat piece of plastic material or metal rolled into a hollow cylindrical form, to fit into or around or over the air-intake portion of an air-duct of a carburetor, and held in position with a garter-spring 41 or the like. The other or upper side of the annular disc member 38 has a spider or yoke 42 spanning and overlying the central opening 38*a* therein. A post 43 extends upwardly from the spider 42 and, preferably, is disposed centrally of the center opening 38*a* in the disc-member 38. The post 43 is externally threaded. An open ended hollow cylinder 44 is vertically disposed over and of a diameter greater than the central opening 38*a*, and has a foraminous partition 45 extending transversely thereof intermediate the ends of said cylinder 44. An internally threaded hollow boss 46 is centrally and vertically positioned on and secured to said partition and is threaded on the post 43 to adjustably support said cylinder above said disc-member 38. The depth of the cylinder 44 and the proportions of the other parts is such that the lower edge 44*a* of the cylinder may be brought to contact with the top surface of the disc-member 38, when the cylinder is adjustably threaded on the post 43 or may be raised therefrom in such amounts as to nicely regulate the amount of diluent atmospheric air admitted under the lower edge 44*a* of the cylinder 44 to the central opening 38*a* of the disc-member 38. A relatively thick layer of liquid absorbent material 47 is supported on and covers the upper surface of the foraminous partition 45 and is to be saturated with the pro-knock liquid compound. By rotating the cylinder 44, the amount of air flow to the carburetor can be varied, thus changing the pro-knock effect as desired to meet the requirements of the engine when removing the carbonaceous deposits from the engine in any of the manners above set forth.

In the specification and claims, the words "vapor" and "vaporous" include "gas" or "gaseous."

From the foregoing description it will be clear that the objects of this invention are attained.

Having described the invention and the manner in which the same may be performed and constructed, it is to be understood that changes and modifications may be made in the exact steps herein recited and that such changes as fall within the scope of the appended claims are within the purview of the present invention and contemplated thereby.

That which is claimed, as new and to be secured by Letters Patent, is:

1. A method, of removing deposits from the combustion-chamber surfaces of an internal-combustion engine, comprising the steps of causing an internal-combustion engine to operate with its normal fuel mixture until in a warm condition; then introducing into the carburetted normal fuel mixture for the engine a vaporous pro-knock material in a quantity sufficient to produce maximum permissible knock effect, while the engine is running at idling speed, until knock is detected, thus causing auto-ignition of the entire mixture, or the majority thereof, in the combustion-chamber of the engine as early as possible in the compression stroke of the engine's piston without causing erratic operation during the operation of the engine; then rapidly accelerating the speed of the engine to about one-half of its throttle to develop a manifold pressure of 20 to 28 inches Hg absolute with the lower value being used for the highest compression ratio engines and the upper value being used for the lowest compression ratio engines and allowing said engine to increase its speed to between 2000 to 4000 r.p.m.; then reducing the speed to idling speed; and then repeating the above operation, until the exhaust thereof is noticeably free of the purged combustion-chamber deposits without exceeding the safe engine temperatures.

2. A method, according to claim 1, wherein said pro-knock material is a compound selected from a group consisting of organic nitrates, organic peroxides or organic ethers having a boiling point ranging between 50 to 350° F.

3. A method, of removing deposits from the combustion-chamber surfaces of an internal combustion engine, comprising the steps of causing an internal combustion engine to operate with its normal fuel mixture; then while the engine is idling passing the air entering the carburetor of the engine in contact with an absorbent substance containing volatile a pro-knock material to entrain said material therewith in vaporous form to the mixing-chamber of the carburetor; controlling the ratio of air-to-pro-knock material admitted to said carburetor to cause auto-ignition of at least the majority thereof, in the combustion-chamber of the engine as early as possible in the compression stroke of the engine's piston without causing erratic operation during the operation of the engine; rapidly accelerating the speed of the engine until the manifold pressure is from 20 to 28 inches Hg absolute with the lower value being used for the highest compression ratio engines and the upper value being used for the lowest compression ratio engines; and allowing said engine to continue to operate under the last stated condition until the exhaust thereof is noticeably free of the purged combustion-chamber deposits.

4. A method, of removing deposits from the combustion-chamber surfaces of an internal combustion engine, comprising: operating the engine with its normal fuel mixture and without external load at idle speed of between about 500 to 1000 r.p.m.; introducing a vaporous detonant material into the air stream flowing to the carburetor of the said engine in a controlled ratio of detonant to air to produce audible knock while the engine is operating at said idling speed but insufficient to cause significant loss in engine speed; then, rapidly accelerating said engine while maintaining substantially constant mixture ratio of said vaporous detonant material to the air admitted to the carburetor of said engine; then, discontinuing said acceleration, when a manifold pressure of 20 to 28 inches Hg absolute is reached, with the lower value being used for the highest compression ratio engines and the upper value being used for the lowest compression ratio engines, and reducing the carburetted fuel mixture to the engine, when the engine speed reaches between 2000 to 4000 r.p.m., so as to return the engine to idling speed; and continuing said manipulation of the running engine for a minimum of 30 cycles until the exhaust from the engine is noticeably free of purged combustion-chamber deposits.

5. A method, of removing deposits from the combustion-chamber surfaces of an internal combustion engine, comprising: Operating said engine with its normal fuel mixture at a speed of between 1000 to 4000 r.p.m. under a load of about 25% to 75% with the lower value being used for the highest compression ratio engines and the upper value being used for the lowest compression ratio engines; then, without altering the normal fuel system and its fuel composition, introducing into the air stream flowing into the carburetor and uniformly mixing therewith the vapor of a detonating fluid; regulating the amount of said vapor in said air to a point to cause the power of the engine to reduce to ¼ to ¾ of what it was before said vapor was introduced into said air stream; and then holding this condition, while the engine is operating, until the exhaust from the engine is noticeably free from the purged combustion-chamber deposits without exceeding the temperature limit of the engine.

6. A method of removing deposits from the combustion-chamber surfaces of an internal combustion engine, comprising the steps of causing an internal combustion engine to operate with its normal fuel mixture; then causing the air entering the carburetor of the engine to entrain therewith the vapor of a pro-knock liquid selected from the class consisting of nitro derivatives of the paraffin hydrocarbons of 1 to 5 carbon atoms, and the nitric acid esters of the lower aliphatic alcohols of 1 to 5 carbon atoms; controlling the ratio of air-to-pro-knock vapor admitted to the carburetor to cause auto-ignition of the entire mixture, or the majority thereof, in the combustion-chamber of the engine as early as possible in the compression stroke of the engine without causing erratic operation during the operation of the engine at 1000 to 4000 r.p.m. and a manifold pressure of 20 to 28 inches Hg absolute with the lower value being used for the highest compression ratio engines and the upper value being used for the lowest compression ratio engines.

7. A method of removing deposits from the combustion-chamber surfaces of a spark-plug ignitable internal-combustion engine, comprising the steps of causing an internal-combustion engine to operate with its normal fuel mixture; then controllably introducing into the air stream of the carburetor of the engine a vaporous detonant material in a ratio of detonant-to-air sufficient to combine with said normal fuel mixture for producing the maximum shock and to cause pre-auto-ignition of at least the majority of said mixture in the combustion-chamber of the engine as early as possible in the compression stroke of the engine's piston; and allowing said engine to continue to operate at about one-half of the engine's full throttle while continuing to controllably supply the detonant material in a quantity to cause early pre-auto-ignition of the fuel mixture with maximum permissible shock intensity until the exhaust thereof is noticeably free of the purged combustion-chamber deposits without exceeding the safe engine temperatures.

8. A method of removing deposits from the combustion chamber surfaces of an internal combustion engine, comprising the steps of causing an internal combustion engine to operate with its normal fuel mixture; then controllably introducing into said carburetted normal fuel mixture a vaporous pro-knock material selected from the class consisting of nitro derivatives of the paraffine hydrocarbons of 1 to 5 carbon atoms and the nitric acid esters of the lower aliphatic alcohols of 1 to 5 carbon atoms in a quantity sufficient to cause auto-ignition of at least the majority of said mixture in the combustion chamber of the engine as early as possible during the compression stroke of the engine's piston without causing erratic operation of the engine; and allowing said engine to continue to operate under the last stated conditions until the exhaust thereof is noticeably free of the purged combustion chamber deposits without exceeding the safe engine temperature.

References Cited in the file of this patent

UNITED STATES PATENTS

| | | |
|---|---|---|
| 1,081,805 | Berry | Dec. 16, 1913 |
| 2,182,874 | Kowalski | Dec. 12, 1939 |
| 2,216,477 | O'Sullivan | Oct. 1, 1940 |
| 2,644,440 | Bailey | July 7, 1953 |
| 2,696,806 | Mingle | Dec. 14, 1954 |
| 2,785,662 | Boyce | Mar. 19, 1957 |